United States Patent
Liu et al.

(10) Patent No.: US 11,376,619 B2
(45) Date of Patent: Jul. 5, 2022

(54) TOOLING FOR WHEEL SPRAYING REINFORCEMENT

(71) Applicant: CITIC Dicastal CO., LTD., Hebei (CN)

(72) Inventors: Huiying Liu, Qinhuangdao (CN); Kuisheng Nie, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 456 days.

(21) Appl. No.: 16/503,618

(22) Filed: Jul. 4, 2019

(65) Prior Publication Data

US 2020/0147629 A1 May 14, 2020

(30) Foreign Application Priority Data

Nov. 12, 2018 (CN) .......................... 201811338879.5

(51) Int. Cl.
*B05B 13/02* (2006.01)
*B05B 13/06* (2006.01)
*B05B 12/30* (2018.01)

(52) U.S. Cl.
CPC .......... *B05B 13/0242* (2013.01); *B05B 12/30* (2018.02); *B05B 13/0285* (2013.01); *B05B 13/0663* (2013.01)

(58) Field of Classification Search
CPC ............ B05B 13/0242; B05B 13/0285; B05B 13/0663; B05B 12/30
See application file for complete search history.

(56) References Cited

U.S. PATENT DOCUMENTS

| | | | | |
|---|---|---|---|---|
| 1,763,611 A * | 6/1930 | Brown | ............... | B29C 37/0071 118/500 |
| 3,962,987 A * | 6/1976 | Brandl | ............... | B29C 37/0071 118/44 |
| 4,430,958 A * | 2/1984 | Boggs | ................ | B05B 13/0242 118/318 |
| 4,723,563 A * | 2/1988 | Kane | ................... | B60C 25/0596 118/320 |
| 5,876,501 A * | 3/1999 | Doan | ..................... | B05C 13/02 118/679 |
| 5,992,227 A * | 11/1999 | Jellison | ................ | B60C 25/132 73/146 |
| 9,944,135 B2 * | 4/2018 | Lawson | ............. | B60C 25/0515 |

(Continued)

FOREIGN PATENT DOCUMENTS

| CN | 101940993 A | 1/2011 |
|---|---|---|
| CN | 103861763 B | 11/2015 |

(Continued)

OTHER PUBLICATIONS

Supplementary European Search Report in the European application No. 19205986.3, dated Mar. 30, 2020.

*Primary Examiner* — Dah-Wei D. Yuan
*Assistant Examiner* — Stephen A Kitt
(74) *Attorney, Agent, or Firm* — Syncoda LLC; Feng Ma

(57) ABSTRACT

A tooling for wheel spraying reinforcement can uniformly apply a hard coating on the inner rim and the spoke back cavity of a wheel, and can effectively solve the technical problems of uneven spraying and poor roundness. The high-precision spraying of the hard coating of the wheel is realized, and the device has novel structure, advanced technology and high universality.

2 Claims, 2 Drawing Sheets

(56) References Cited

U.S. PATENT DOCUMENTS

2015/0273493 A1* 10/2015 Xue .................. B21H 1/10
 239/224
2019/0022710 A1 1/2019 Liu et al.

FOREIGN PATENT DOCUMENTS

| | | | |
|---|---|---|---|
| CN | 107282503 | A | 10/2017 |
| CN | 108686877 | A | 10/2018 |
| DE | 102007060492 | A1 | 6/2009 |
| EP | 2219791 | A1 | 8/2010 |

* cited by examiner

TOOLING FOR WHEEL SPRAYING REINFORCEMENT

CROSS-REFERENCE TO RELATED APPLICATIONS

The present application claims benefit of Chinese Application No. 201811338879.5, filed on Nov. 12, 2018, the contents of which are hereby incorporated by reference in its entirety.

BACKGROUND

With the development of wheel manufacturing technology, the hard coating has begun to be applied to wheels in order to improve wear resistance, high temperature resistance and corrosion resistance. The reinforcement position is generally the inner rim and the spoke back cavity. Because the wheel hard coating reinforcement belongs to an emerging process and lacks corresponding supporting tooling, the present disclosure provides a tooling for wheel spraying reinforcement based on the current situation.

SUMMARY

The present disclosure relates to the technical field of a tooling for wheel spraying reinforcement, and in particular, to a tooling required for spraying reinforcement of a hard coating of a wheel.

An object of the present disclosure is to provide a tooling for wheel spraying reinforcement, which can uniformly apply a hard coating on the inner rim and the spoke back cavity of a wheel, and can effectively solve the technical problems of uneven spraying and poor roundness. The high-precision spraying of the hard coating of the wheel is realized, and the device has novel structure, advanced technology and high universality.

In order to achieve the above objective, the technical solution of the present disclosure is that. A tooling for wheel spraying reinforcement is composed of a frame, a lower guide post, an adjusting cylinder I, a guide sleeve, a lifting platform, an inner rim nozzle, a fixed plate, a guide rail, an adjusting cylinder II, a sliding table, a spoke nozzle, a support plate, a swivel guide sleeve, a swivel, a servo motor, a clamp cylinder pressing claw, a bearing seat, a shaft, a tensioning cylinder, a pull rod, an expansion sleeve, an expansion core, a left guide post, a left cylinder, a left platform, a left roller, upper guide rails, a left sliding table, a gear rack, a right sliding table, a distance adjusting cylinder, an upper cylinder, an upper guide post, an upper platform, a bracket, a motor and an upper roller.

The tooling for wheel spraying reinforcement is composed of three parts: a wheel hub positioning and rotating system, used for inner rim axial positioning, central hole radial positioning, clamp cylinder pressing, and motor driven-rotating; a wheel assisting system, used for assisting wheel rotating, eliminating radial impact and axial impact, and improving spraying precision; and a hard coating spraying system, used for achieving spraying reinforcement of wheels with different sizes by adjusting the position of a nozzle. The three systems cooperate with each other and work together to form a tooling for wheel spraying reinforcement.

The support plate is fixed on the frame, and the swivel guide sleeve is fixed on the support plate. The swivel is matched with the swivel guide sleeve, and three clamp cylinder pressing claws are uniformly distributed in the upper surface circumference of the swivel. The servo motor is fixedly mounted on the center under the support plate, and the output end of the motor is connected to the shaft. The upper end of the shaft is internally fitted with a tensioning cylinder, and the output end of the tensioning cylinder is connected to the pull rod, the pull rod is connected with the expansion core, and the expansion core is matched with the expansion sleeve. The upper surface of the swivel can realize the axial positioning of the wheel, and the tensioning cylinder can be used to tension the expansion core, so that the expansion sleeve radially positions the wheel, and the clamp cylinder pressing claws can press the wheel tightly. The servo motor drives the shaft to rotate, thereby driving the wheel to rotate, and this is the wheel hub positioning and rotating system.

During the wheel spraying reinforcement, the wheel is subject to the high-speed impact of hard coating particles, which is liable to cause wheel deformation or uneven spraying, and poor roundness of the coating. Therefore, the wheel assisting system is arranged to assist the wheel rotation and eliminate the axial impact and radial impact. The left cylinder is mounted on the left side of the frame, and the left platform is mounted on the cylinder output end. The left cylinder controls the horizontal feeding of the left platform under the guiding action of the left guide post, and the left roller is mounted on the left platform through a roller shaft and the bracket. The arrangement on the right side of the frame is the same as that of the left side and the arrangements are symmetrical. During the wheel inner rim spraying reinforcement, the rollers on the left and right sides can eliminate the radial impact, thereby improving the spraying accuracy. The upper guide rails are symmetrically mounted on the top of the frame, the left sliding table and the right sliding table are mounted on the upper guide rails and connected by a gear rack, and distance between the left sliding table and the right sliding table can be adjusted by the distance adjusting cylinder. The upper cylinder is fixed on the left sliding table, the output end of the upper cylinder is connected to the upper platform, and the upper cylinder controls the upper platform to move up and down under the guiding action of the upper guide post. The bracket is fixed on the upper platform, the motor is fixed on the bracket, and the output end of the motor is connected to the upper roller to control the rotation of the upper roller. The arrangement of the right sliding table is the same as that of the left sliding table. During the wheel spoke spraying reinforcement, the two upper rollers on the left sliding table and the right sliding table can assist the rotation of the wheel and eliminate the axial impact of the wheel, thereby improving the spraying accuracy, and this is the wheel assisting system.

In order to make the device more versatile and adjustable, the rim reinforcement and the spoke reinforcement are separated. The inner rim reinforcement mainly considers the up and down adjustment to adapt to the inner rim reinforcement of wheels of different heights. The wheel spoke reinforcement mainly considers the horizontal adjustment to adapt to the spoke reinforcement of wheels of different diameters. The adjusting cylinder I is fixed at the bottom of the frame, and controls the lifting platform to move up and down under the guiding action of the lower guide post. The inner rim nozzle is fixed on the lifting platform, and the hard coating particles may be provided by an external auxiliary device, enter the inner rim nozzle, and then spray to the inner rim from the spraying head. The adjusting cylinder II is fixed on the fixed plate on the side of the frame, and controls the horizontal movement of the sliding table under the guiding action of the guide rail, and the spoke nozzle is fixed on the sliding table. The hard coating particles may be provided by an external auxiliary device, enter the spoke nozzle, and then spray to the spoke back cavity from the spraying head, and this is the hard coating spraying system.

A working process of the tooling for wheel spraying reinforcement is as follows: firstly, the wheel is placed on the device positioning system, and the upper surface of the swivel can realize the axial positioning of the wheel, and the tensioning cylinder is used to tension the expansion core, so that the expansion sleeve radially positions the wheel, and the clamp cylinder pressing claws can press the wheel tightly. The servo motor drives the shaft to rotate, thereby driving the wheel to rotate. Then, the auxiliary system works, the rollers on the left and right sides are close to the wheel and make contact with the wheel, the above two rollers are lowered to make contact with the wheel, and the motor drives the upper roller to rotate, thereby assisting the rotation of the wheel. Finally, the hard coating particles may be provided by an external auxiliary device, and are sprayed out from the nozzle to reinforce the inner rim and the spoke back cavity separately.

During the tooling working process, the radial impact and the axial impact can be eliminated, so that the spraying precision is greatly improved, and the spraying reinforcement of the wheels with different sizes can be realized by adjusting the position of the nozzles, so that the tooling is more versatile. The present disclosure can uniformly apply a hard coating on the inner rim and the spoke back cavity of a wheel, and can effectively solve the technical problems of uneven spraying and poor roundness. The high-precision spraying of the hard coating of the wheel is realized, and the device has novel structure, advanced technology and high universality.

DETAILED DESCRIPTION

The following describes details and operation of a specific device provided by the present disclosure with reference to the accompanying drawings.

Figure 1:
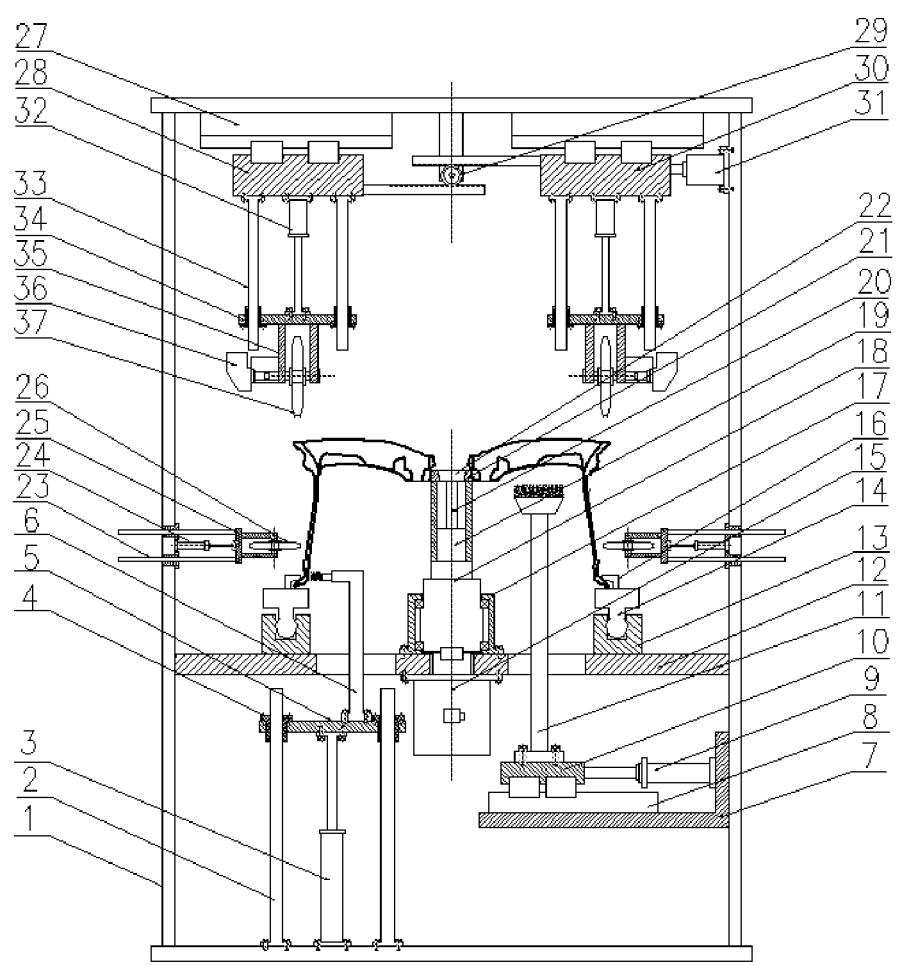
FIG. 1 is a front view of a tooling for wheel spraying reinforcement of the present disclosure.
Figure 2:
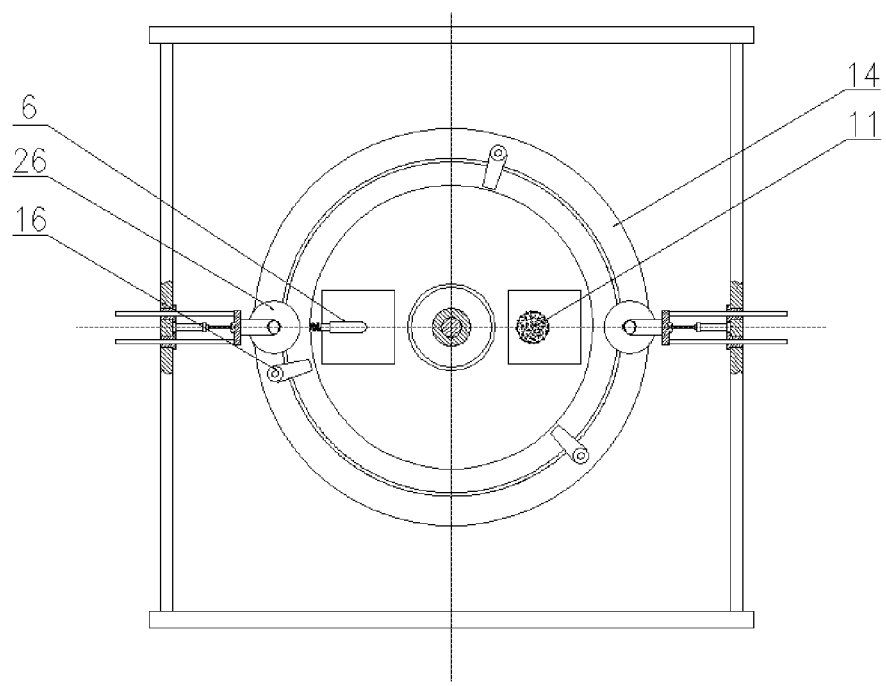
FIG. 2 is a top view of a tooling for wheel spraying reinforcement of the present disclosure.

As illustrated in FIG. 1 and FIG. 2, a tooling for wheel spraying reinforcement can comprise a frame 1, a lower guide post 2, an adjusting cylinder I 3, a guide sleeve 4, a lifting platform 5, an inner rim nozzle 6, a fixed plate 7, a guide rail 8, an adjusting cylinder II 9, a sliding table 10, a spoke nozzle 11, a support plate 12, a swivel guide sleeve 13, a swivel 14, a servo motor 15, a clamp cylinder pressing claw 16, a bearing seat 17, a shaft 18, a tensioning cylinder 19, a pull rod 20, an expansion sleeve 21, an expansion core 22, a left guide post 23, a left cylinder 24, a left platform 25, a left roller 26, upper guide rails 27, a left sliding table 28, a gear rack 29, a right sliding table 30, a distance adjusting cylinder 31, an upper cylinder 32, an upper guide post 33, an upper platform 34, a bracket 35, a motor 36 and an upper roller 37.

The tooling for wheel spraying reinforcement is composed of three parts: a wheel hub positioning and rotating system, used for inner rim axial positioning, central hole radial positioning, clamp cylinder pressing, and motor driven-rotating; a wheel assisting system, used for assisting wheel rotating, eliminating radial impact and axial impact, and improving spraying precision; and a hard coating spraying system, used for achieving spraying reinforcement of wheels with different sizes by adjusting the position of a nozzle. The three systems cooperate with each other and work together to form a tooling for wheel spraying reinforcement.

The support plate 12 is fixed on the frame 1, and the swivel guide sleeve 13 is fixed on the support plate 12. The swivel 14 is matched with the swivel guide sleeve 13, and three clamp cylinder pressing claws 16 are uniformly distributed in the upper surface circumference of the swivel 14. The servo motor 15 is fixedly mounted on the center under the support plate 12, and the output end of the motor is connected to the shaft 18. The upper end of the shaft 18 is internally fitted with a tensioning cylinder 19, and the output end of the tensioning cylinder 19 is connected to the pull rod 20, the pull rod 20 is connected with the expansion core 22, and the expansion core 22 is matched with the expansion sleeve 21. The upper surface of the swivel 14 can realize the axial positioning of the wheel, and the tensioning cylinder 19 can be used to tension the expansion core 22, so that the expansion sleeve 21 radially positions the wheel, and the clamp cylinder pressing claws 16 can press the wheel tightly. The servo motor 15 drives the shaft 18 to rotate, thereby driving the wheel to rotate, and this is the wheel hub positioning and rotating system.

During the wheel spraying reinforcement, the wheel is subject to the high-speed impact of hard coating particles, which is liable to cause wheel deformation or uneven spraying, and poor roundness of the coating. Therefore, the wheel assisting system is arranged to assist the wheel rotation and eliminate the axial impact and radial impact. The left cylinder 24 is mounted on the left side of the frame 1, and the left platform 25 is mounted on the cylinder output end. The left cylinder 24 controls the horizontal feeding of the left platform 25 under the guiding action of the left guide post 23, and the left roller 26 is mounted on the left platform 25 through a roller shaft and the bracket. The arrangement on the right side of the frame is the same as that of the left side and the arrangements are symmetrical. During the wheel inner rim spraying reinforcement, the rollers on the left and right sides can eliminate the radial impact, thereby improving the spraying accuracy. The upper guide rails 27 are symmetrically mounted on the top of the frame 1, the left sliding table 28 and the right sliding table 30 are mounted on the upper guide rails 27 and connected by a gear rack 29, and distance between the left sliding table 28 and the right sliding table 30 can be adjusted by the distance adjusting cylinder 31. The upper cylinder 32 is fixed on the left sliding table 28, the output end of the upper cylinder 32 is connected to the upper platform 34, and the upper cylinder 32 controls the upper platform 34 to move up and down under the guiding action of the upper guide post 33. The bracket 35 is fixed on the upper platform 34, the motor 36 is fixed on the bracket 35, and the output end of the motor 36 is connected to the upper roller 37 to control the rotation of the upper roller 37. The arrangement of the right sliding table 30 is the same as that of the left sliding table 28. During the wheel spoke spraying reinforcement, the two upper rollers 37 on the left sliding table 28 and the right sliding table 30 can assist the rotation of the wheel and eliminate the axial impact of the wheel, thereby improving the spraying accuracy, and this is the wheel assisting system.

In order to make the device more versatile and adjustable, the rim reinforcement and the spoke reinforcement are separated. The inner rim reinforcement mainly considers the up and down adjustment to adapt to the inner rim reinforcement of wheels of different heights. The wheel spoke reinforcement mainly considers the horizontal adjustment to adapt to the spoke reinforcement of wheels of different diameters. The adjusting cylinder I 3 is fixed at the bottom of the frame 1, and controls the lifting platform 5 to move up and down under the guiding action of the lower guide post 2. The inner rim nozzle 6 is fixed on the lifting platform 5, and the hard coating particles may be provided by an external auxiliary device, enter the inner rim nozzle 6, and then spray to the inner rim from the spraying head. The adjusting cylinder II 9 is fixed on the fixed plate 7 on the side of the frame 1, and controls the horizontal movement of the sliding table 10 under the guiding action of the guide rail 8, and the spoke nozzle 11 is fixed on the sliding table 10. The hard coating particles may be provided by an external auxiliary device, enter the spoke nozzle, and then spray to the spoke back cavity from the spraying head, and this is the hard coating spraying system.

A working process of the tooling for wheel spraying reinforcement is as follows: firstly, the wheel is placed on the device positioning system, and the upper surface of the swivel 14 can realize the axial positioning of the wheel, and the tensioning cylinder 19 is used to tension the expansion core 22, so that the expansion sleeve 21 radially positions the wheel, and the clamp cylinder pressing claws 16 can press the wheel tightly. The servo motor 15 drives the shaft 18 to rotate, thereby driving the wheel to rotate. Then, the auxiliary system works, the rollers on the left and right sides are close to the wheel and make contact with the wheel, the above two rollers are lowered to make contact with the wheel, and the motor 36 drives the upper roller 37 to rotate, thereby assisting the rotation of the wheel. Finally, the hard coating particles may be provided by an external auxiliary device, and are sprayed out from the nozzle to reinforce the inner rim and the spoke back cavity separately.

During the tooling working process, the radial impact and the axial impact can be eliminated, so that the spraying precision is greatly improved, and the spraying reinforcement of the wheels with different sizes can be realized by adjusting the position of the nozzles, so that the tooling is more versatile. The present disclosure can uniformly apply a hard coating on the inner rim and the spoke back cavity of a wheel, and can effectively solve the technical problems of uneven spraying and poor roundness. The high-precision spraying of the hard coating of the wheel is realized, and the device has novel structure, advanced technology and high universality.

The invention claimed is:

1. A tooling for spraying reinforcement on a wheel, comprising a frame, a lower guide post, an adjusting cylinder I, a guide sleeve, a lifting platform, an inner rim nozzle, a fixed plate, a guide rail, an adjusting cylinder II, a sliding table, a spoke nozzle, a support plate, a swivel guide sleeve, a swivel, a servo motor, three clamp cylinder pressing claws, a bearing seat, a shaft, a tensioning cylinder, a pull rod, an expansion sleeve, an expansion core, a left guide post, a left cylinder, a left platform, a left roller, upper guide rails, a left sliding table, a gear rack, a right sliding table, a distance adjusting cylinder, an upper cylinder, an upper guide post, an upper platform, a bracket, a motor and two upper rollers, wherein the support plate is fixed on the frame; the swivel guide sleeve is fixed on the support plate; the swivel is matched with the swivel guide sleeve; the three clamp cylinder pressing claws are uniformly distributed in an upper surface circumference of the swivel; the servo motor is fixedly mounted on a center under the support plate, and an output end of the motor is connected to the shaft; an upper end of the shaft is internally fitted with the tensioning cylinder, and an output end of the tensioning cylinder is connected to the pull rod; the pull rod is connected with the expansion core, and the expansion core is matched with the expansion sleeve; an upper surface of the swivel realizes axial positioning of the wheel, and the tensioning cylinder is used to tension the expansion core, so that the expansion sleeve radially positions the wheel; the three clamp cylinder pressing claws can press the wheel tightly; and the servo motor drives the shaft to rotate, thereby driving the wheel to rotate.

2. The tooling for spraying reinforcement on the wheel according to claim 1, wherein when a wheel spoke is subjected to the spraying reinforcement; the two upper rollers on the left sliding table and the right sliding table both assist the rotation of the wheel and eliminate an axial impact force of the wheel; the adjusting cylinder I is fixed at a bottom of the frame and controls the lifting platform to move up and down under an action of the lower guide post; the inner rim nozzle is fixed on the lifting platform; hard coating particles are provided by an external auxiliary device, enter into the inner rim nozzle, and then spray to an inner rim from a spraying head; the adjusting cylinder II is fixed on the fixed plate on a side of the frame and controls a horizontal movement of the sliding table under a guiding action of the guide rail; the spoke nozzle is fixed on the sliding table; the hard coating particles are provided by the external auxiliary device, enter the spoke nozzle, and then spray to a spoke back cavity from a spraying head; an inner rim reinforcement and a spoke reinforcement are separated; the inner rim reinforcement mainly considers an up and down adjustment to adapt to the inner rim reinforcement of wheels of different heights; and the spoke reinforcement mainly considers a horizontal adjustment to adapt to the spoke reinforcement of wheels of different diameters.

\* \* \* \* \*